United States Patent
Möller et al.

(10) Patent No.: US 10,739,286 B2
(45) Date of Patent: Aug. 11, 2020

(54) METHOD FOR COATING A SURFACE OF A METAL STRIP AND A METAL STRIP-COATING DEVICE

(71) Applicants: THYSSENKRUPP STEEL EUROPE AG, Duisburg (DE); thyssenkrupp AG, Essen (DE)

(72) Inventors: Thomas Möller, Duisburg (DE); Arno Neerfries, Dinslaken (DE); Ingo Rogner, Ingolstadt (DE)

(73) Assignees: THYSSENKRUPP STEEL EUROPE AG, Duisburg (DE); thyssenkrupp AG, Essen (DE)

( * ) Notice: Subject to any disclaimer, the term of this patent is extended or adjusted under 35 U.S.C. 154(b) by 39 days.

(21) Appl. No.: 15/736,706

(22) PCT Filed: Jun. 23, 2016

(86) PCT No.: PCT/EP2016/064614
§ 371 (c)(1),
(2) Date: Dec. 14, 2017

(87) PCT Pub. No.: WO2016/207315
PCT Pub. Date: Dec. 29, 2016

(65) Prior Publication Data
US 2018/0202954 A1    Jul. 19, 2018

(30) Foreign Application Priority Data
Jun. 25, 2015   (DE) .................. 10 2015 211 853

(51) Int. Cl.
*G01N 25/72*   (2006.01)
*B05D 7/14*    (2006.01)
*B05C 11/10*   (2006.01)
*G01N 21/89*   (2006.01)
*G01N 21/00*   (2006.01)
*B05C 1/02*    (2006.01)
*B05C 13/00*   (2006.01)
(Continued)

(52) U.S. Cl.
CPC ............. *G01N 25/72* (2013.01); *B05C 1/025* (2013.01); *B05C 11/1005* (2013.01); (Continued)

(58) Field of Classification Search
None
See application file for complete search history.

(56) References Cited

U.S. PATENT DOCUMENTS

2015/0064343 A1*   3/2015   Lu ........................... B05C 9/04
                                                                427/9

FOREIGN PATENT DOCUMENTS

| CN | 1908221 A   | 2/2007  |
| CN | 102300809 A | 12/2011 |

(Continued)

OTHER PUBLICATIONS

Machine Translation of JP 2013-134217 A (Year: 2013).*
(Continued)

*Primary Examiner* — Shamim Ahmed
*Assistant Examiner* — Bradford M Gates
(74) *Attorney, Agent, or Firm* — Avant Law Group, LLC

(57) ABSTRACT

A method for coating a surface of a substrate may involve coating the surface of the substrate with a wet coating by way of a coating station, conveying the substrate by way of a conveying device, and detecting the surface coated with the wet coating by producing a thermal image of a detection region that comprises part of the surface. The thermal image may be recorded in a spectral range that includes a wavelength between 1 micrometer and 20 micrometers. Further, the detection region may be located directly downstream of the coating station, or the detection region may at least partially include the coating station.

15 Claims, 4 Drawing Sheets

(51) Int. Cl.
  *B05D 1/28* (2006.01)
  *G01B 21/08* (2006.01)
  *B05C 1/08* (2006.01)
  *B05C 5/02* (2006.01)

(52) U.S. Cl.
  CPC ............... *B05C 13/00* (2013.01); *B05D 1/28* (2013.01); *B05D 7/14* (2013.01); *G01B 21/085* (2013.01); *G01N 21/00* (2013.01); *G01N 21/8914* (2013.01); *B05C 1/0826* (2013.01); *B05C 5/0245* (2013.01); *B05D 2252/02* (2013.01); *G01N 2021/8918* (2013.01)

(56) References Cited

FOREIGN PATENT DOCUMENTS

| | | |
|---|---|---|
| CN | 102458253 A | 5/2012 |
| DE | 102004016313 A | 10/2005 |
| DE | 10200545780 A | 4/2007 |
| DE | 102006009912 A | 9/2007 |
| EP | 2350627 A | 8/2011 |
| JP | H1183773 A | 3/1999 |
| JP | H11281603 A | 10/1999 |
| JP | 2008014959 A | 1/2008 |
| JP | 2013134217 A | 7/2013 |
| WO | 2009112452 A | 9/2009 |
| WO | 2010033113 A | 3/2010 |

OTHER PUBLICATIONS

Machine Translation of WO 2009112452 A2 (Year: 2009).*
Michael J. Haugh et al: "Paint skip detector", Optical Sensing II, vol. 1313, Mar. 1, 1990 (Mar. 1, 1990), pp. 190-199. [[Cited in ISR of PCT/EP2016/064614.]].
English translation of the ISR issued in PCT/EP2016/064614 dated Nov. 9, 2016 (dated Nov. 16, 2016).

* cited by examiner

METHOD FOR COATING A SURFACE OF A METAL STRIP AND A METAL STRIP-COATING DEVICE

CROSS REFERENCE TO RELATED APPLICATIONS

This application is a U.S. National Stage Entry of International Patent Application Serial Number PCT/EP2016/064614, filed Jun. 23, 2016, which claims priority to German Patent Application No. DE 10 2015 211 853.3, filed Jun. 25, 2015, the entire contents of both of which are incorporated herein by reference.

FIELD

The present disclosure generally relates to methods for coating surfaces of metal strip, metal strip-coating devices, computer products for use in connection with metal strip devices, and methods of employing thermal imaging cameras.

BACKGROUND

Metal strips are usually coated, in order to be able to bring about desired functionalities, in particular on the surface of the metal strips. Depending on the type, nature and desired functionality of the surface, various methods of pretreatment are used. Common important desired aims of surface treatments are cleaning the surface to be coated, providing the surface with corrosion protection, optimum bonding conditions between the surface and the subsequent coating and also for example providing the surface with some other functional coating.

Increasing requirements for the metal strips, including with regard to their mechanical and thermal stability, for example during forming processes involving great deformation loading, require very high quality of the coatings with regard to their bonding on the treated surfaces. For this reason, it is required for example that pretreatment layers have a uniform and uninterrupted application, in order to ensure continuous and good bonding for subsequent coatings of the surface. Inspection of the coated surfaces is of great importance in this connection, to allow coating defects to be ruled out, or largely ruled out.

A known method for inspecting the quality of applied coatings, for example coatings applied by means of roller application, is analytics of the coated surfaces by means of infrared radiation for NIR analytics, NIR being the abbreviation for a wavelength range of the infrared radiation that is used. However, the measurements that are typically performed with such methods have the disadvantage that, with different coatings, great differences in the infrared spectra are obtained, whereby the evaluation of the infrared spectra requires great effort. A further disadvantage of NIR analytics is often that a measurement of individual points is performed, for example a traversing point measurement. This entails the disadvantage that uninterrupted monitoring of the coating is not possible. This measuring method is consequently inadequate for application areas in which surfaces without coating defects or largely without coating defects are required.

An example of a method for coating a metal strip is presented in WO 2009/112452. The method explained comprises recording IR-spectroscopic measurement data on the basis of Fourier transform IR spectroscopy. Although continuous recording is possible during the coating of the metal strip, in the case of the method described it has proven to be disadvantageous on the one hand that there is a necessity inherent in the method for comparatively complex evaluation of the measured spectra, and on the other hand that the area coverage is limited by the chosen type of spectrometer.

A method for ascertaining defects in a surface of a moving material, in particular a metal strip, is disclosed by WO 2010/033113. The method explained comprises heating the metal strip with subsequent thermography. However, because of the required process of active heating, the method described is complex, and therefore does not allow uninterrupted checking of the surface quality of the coated surface, or only allows it with great effort.

Thus a need exists for a method for coating a surface of a metal strip where the method makes it possible for the surface quality of the coated surface to be checked uninterruptedly, preferably both with regard to the surface coverage and with regard to the time dimension.

DETAILED DESCRIPTION

Figure 1A:
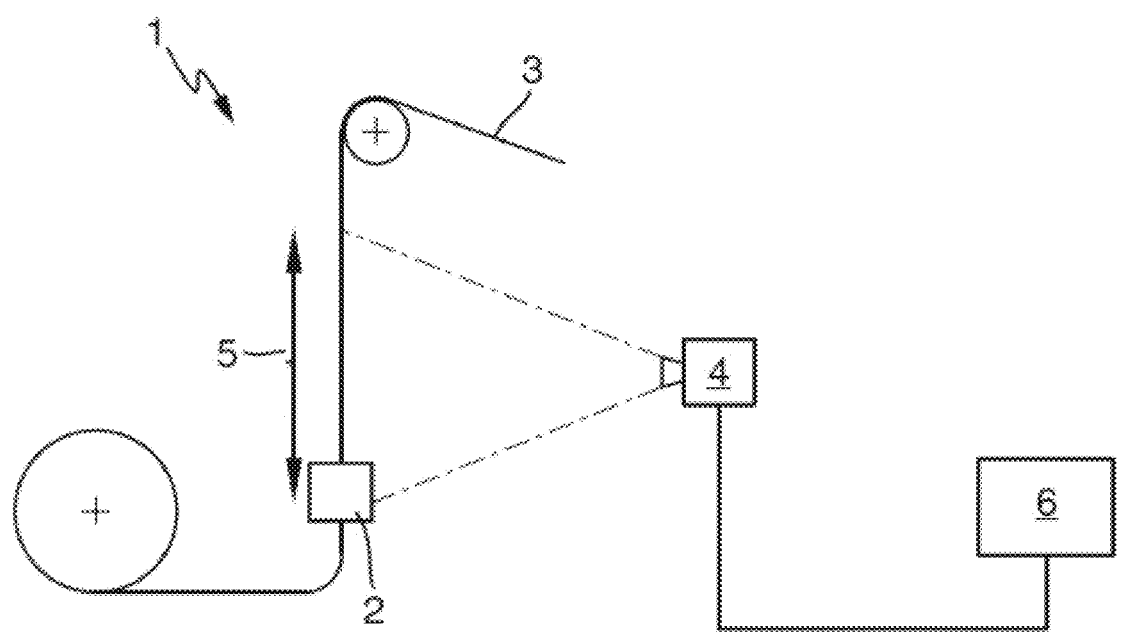
FIG. 1a is a schematic view of an example metal strip-coating device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One having ordinary skill in the art would appreciate that one or more features from the claims, the description and the figures may be combined with one or more features from further refinements of the present disclosure. One or more features from the independent claims may also be replaced by one or more features and combined with them. The subject matter proposed should only be understood as a draft for formulating the present disclosure, without however restricting it.

A method for coating a surface of a metal strip is proposed. The method comprises the following steps:
- coating the surface of the metal strip with a wet coating by means of a coating station,
- conveying the metal strip by means of a metal strip-conveying device,
- detecting a surface coated with the wet coating by producing a thermal image of a detection region which comprises part of the surface.

The term metal strip comprises here metal strips of any desired metallic materials. In a refinement of the method, the metal strip may be formed in particular as a steel strip.

A commonly used possible way of coating the surface of a metal strip with a wet coating is performed by means of a coating station. Such a coating station is typically designed in such a way that the strip runs through the coating station and is coated with the wet coating by means of the coating station. The wet coating may be for example functional coatings, it being possible for any desired functions to be provided by means of the coating, such as for example optical or decorative functionalities or corrosion protection functionalities, but also other functionalities. Further examples of possible functionalities are protection from contamination or oxidation of surfaces.

A detection of the surface coated with the wet coating is performed by means of producing a thermal image. This involves producing a thermal image of a region, the region comprising part of the surface. In this way, a two-dimensional temperature distribution of the metal strip running through is performed directly after wetting the surface of the strip. In the case of a coating station that performs wetting of the surface of the strip by means of application rollers, the ascertainment of the two-dimensional temperature distribution of the metal strip running through takes place directly after the wetting of the surface of the strip by the application rollers.

This may involve detecting a thermal radiation that is emitted by the metal strip and/or its coating. A thermal radiation that is reflected by the metal strip and/or its coating may likewise be detected.

Producing a thermal image may be performed for example by means of a thermal imaging camera. A thermal imaging camera, occasionally also referred to as a thermographic, thermal or infrared camera, refers to an imaging device that is based on the reception of infrared radiation. The use of a thermal imaging camera has as a consequence in particular the advantage that a two-dimensional thermal image can be recorded. Furthermore, the thermal imaging camera offers the advantage that the two-dimensional thermal image can, if desired, also be made available in real time. The spatial resolution of the measuring points is dependent on the type and installation of the thermal imaging camera and may also be below one square millimeter.

The term wet coating refers to a coating that is liquid during the time of the coating. The liquid state of the wet coating may for example be a result of the wet coating being provided in a water-based form. It may, however, also be provided that an oil-based wet coating is made available. Similarly, it may for example be provided that a proportion of water or oil or some other liquid substance is contained in the wet coating. Likewise, solvent-based wet coatings may also be provided. Inorganic or organic liquids or else liquids with dissolved inorganic or organic substances may for example be provided as the solvent.

The differences in the emissivity of the wet coating and the emissivity of the coated metal strip have the result that the wet coating appears on the thermal image recorded by means of the thermal imaging camera with a different temperature representation than the metal strip, even though the wet coating and the metal strip are at approximately the same temperature.

A major advantage of detecting the emitted thermal radiation of the surface coated with the wet coating is that an uninterrupted two-dimensional, contactless and real-time check of the coated metal strip can be performed. In particular, it is made possible by the method explained that a full-area, uninterrupted quality-control check of an entire metal strip running through the coating process can be performed. By contrast with the otherwise necessary detection only at discrete points, for example also in the form of traversing point measurements, there is likewise the advantage that uninterrupted monitoring of the entire metal strip running through the detection region is made possible.

Since the functional principle of the method described presupposes a significant difference in the emissivities, it is in particular an advantage that the method explained can also be carried out without external heating of the substrate.

It can therefore be envisaged in particular to carry out the method without specific external heating of the substrate.

A further advantage of the method described is that thermal imaging cameras are used as standard in customary production facilities at present, whereby on the one hand comparatively affordable procurement and use is ensured and on the other hand the apparatus and skills that are required for it to be used are also already available in many cases.

In a refinement of the method, it may for example be provided that the thermal image is recorded in a spectral range which comprises at least a wavelength between 1 micrometer and 20 micrometers, preferably at least a wavelength between 7 micrometers and 20 micrometers. The comparatively long-wave spectral range between 7 µm and 20 µm has the particular advantage here that a large number of metals have a very low emissivity in this wavelength range, so that the difference from the emissivity of wet coatings is maximized. As a result, particularly good resolution of the thermal images produced by the methods described is achieved, leading to results that can still be reliably evaluated even under unfavorable measuring conditions. In the case of a large number of metallic materials, the greatest contrast lies in the LW range, that is to say between 7 micrometers and 20 micrometers, so that use of thermal imaging cameras that are suitable for the LW range of the infrared spectrum is particularly advantageous and can be provided.

Since many commercially available thermal imaging cameras cover thermal imaging in a spectral range of 7 micrometers to 14 micrometers, it may be provided in a specific refinement that the thermal image is recorded in a spectral range which comprises the entire spectral range between 7 and 14 micrometers.

This advantage particularly comes into effect in cases in which a thermal image of the still wet or moist wet coating is recorded, since the emissivity of water, oil, solvents and other liquids is significantly higher than the emissivity of metals within the spectral range mentioned.

A further refinement of the method may for example provide that the detection region is located directly downstream of the coating station.

The arrangement of the detection region directly downstream of the coating station should be understood here in the sense that a metal strip running in a running direction through the coating station is detected as it runs out of the coating station.

This produces the advantage in particular that the wet film is still wet or moist, whereby, on account of the explained differences in the emissivities, the desired imaging of coated and uncoated regions by means of thermal imaging is correspondingly made much easier.

Also in the case of measurements performed directly after the coating, there is approximately an equal temperature of the wet film and the substrate on account of the generally comparable initial temperature and also on account of the low heat capacity of a wet film when it is applied as a thin film. Already in terms of quality, it is possible to identify directly in the two-dimensional representation of the thermal imaging camera at which positions wet film is present and at which positions no wet film is present on account of the great difference in the emissivities, even if the exact emissivities of the metal strip and of the wet coating are not known.

A further refinement of the method may for example provide that the detection region is located directly downstream of the coating station and the detection region at least partially comprises the coating station.

An advantage of detecting a region that is located directly downstream of the coating station, while at the same time at least partially comprising the coating station in the detection region, also has as a consequence in particular the advantage that at least steps of the process of coating as such can be represented. Thus, for example, the moment of lifting off of the application roller, running through of a partially wet tack weld, with remains of moisture of the previous cleaning and rinsing operation, and/or replacement of the application roller can be represented. These representations can be checked thereafter, for example with the subsequent detection of defects in the coating, so that thermal imaging may also be helpful in seeking the cause of defects that are present.

In one refinement it may be advantageously provided that the detection region comprises an entire widthwise extent of the metal strip. This ensures that the entire surface of the metal strip is depicted, for example with regard to its quality.

A further form of the method that is given by way of example may provide for example that the thermal image is produced as a continuous thermal imaging film. The advantage of a continuous thermal imaging film is that the data is available in its entirety, so that along a length of the metal strip, preferably along the total length of the metal strip, a corresponding image from the thermal imaging film can be assigned and/or extracted and evaluated.

A further refinement of the method that is given by way of example may provide that a portion of film of the thermal imaging film is produced in such a way that it can be assigned to a portion of strip of the metal strip. An assignment of the portion of film of the thermal imaging film to a portion of strip of the metal strip may be performed for example by a position of the metal strip being assigned to a continuous timestamp of the thermal imaging film as a function of the speed with which the metal strip runs through the coating station and the time that has elapsed since the beginning of the coating of the metal strip.

It may, however, also be provided for example that optical markings which represent a position and which are then represented by means of the thermal image are provided on the metal strip. This gives rise in particular to the advantage that, in the case of an ex-situ evaluation of the thermal imaging film, an evaluated thermal image can be assigned to a position of the surface of the metal strip. Thus, for example, after an evaluation of a thermal image, a separate roll of strip, also referred to as a coil, can for example be assigned a corresponding number of defects or defect quality category.

A refinement of the method may provide that the thermal image is continuously scanned for a temperature difference and, if a temperature difference that is greater than a reference difference is found, there is output a marking value which is assigned to a portion of the substrate and/or to a substrate.

In a further refinement of the method, it may be provided for example that the thermal image is continuously scanned for a temperature difference and, if a temperature difference that is greater than a reference difference is found, there is output a marking value which is assigned to a portion of strip of the metal strip and/or to a roll of strip. Assigning a portion of strip may comprise here for example solutions that ensure a marking that is accurate to within 1 m. Such a marking, and also a marking that is more accurate by a factor of 2 to 4, is already achievable without any problem with customary strip-coating installations, whereby implementation can be achieved with only little conversion effort.

An assignment of a combination of at least two markings may also be provided, a first marking being assigned to a roll of strip and a second marking being assigned to a portion of strip.

The term continuous scanning also comprises here in particular quasi-continuous scanning, which means that repeated scans between which certain time intervals lie are also referred to as continuous scanning. In specific refinements, for example, those repeated scans between which time intervals of less than 0.1 s lie may be referred to as continuous scanning. The term temperature difference relates to differences in indicated temperatures. As explained at the beginning, the indicated temperatures here do not indicate actual temperatures but rather, on account of the different emissivities of the wet coating and of the metal strip, a representation of different temperatures when there is actually the same temperature. The temperature difference consequently corresponds here to a coating defect, which for example is dependent on the actual deviation of the thickness of the wet coating from the intended thickness of the wet coating or dependent on whether a coated position or an uncoated position is evaluated.

The output of a marking value may be understood for example as an assignment of a marking value to a position of the metal strip or a portion of strip of the metal strip, for example in the form of a list entry. Thus, for example, a unique assignment of the metal strip and/or a unique assignment of the portion of strip of a metal strip can be established with the marking value. The marking value may for example be a binary value, which merely represents that a defect is present in a bijectively assigned portion of strip. Similarly, however, the marking value may also provide a qualitative representation of the temperature difference, whereby for example a variable for the quantitative deviation from a target thickness of the wet coating or else a measure of an area of an unintentionally uncoated point of the metal strip is quantitatively recorded.

It may consequently be provided for example that the reference difference of an absolute deviation is less than 5.0 kelvins.

One particular advantage that can be used in the case of a successively performed wet coating of metal strip coils is that the thermal image of the uncoated region in the transitional region between two coils can be used for adjusting the assignment of an indicated temperature scale in relation to an uncoated region of the metal strip. It may in particular be envisaged to use a thermal image of a transitional region between a first metal strip and a second metal strip for the ascertainment of a reference temperature for the determination explained further above of the reference difference in the evaluation of the thermal imaging film of the second metal strip.

In another refinement of the method, it may for example be provided that the reference difference can be set. One possibility for setting the reference difference advantageously makes it possible that, according to the given emissivities or further optical or other conditions, the sensitivity of the measuring method can be increased or reduced to the level required in each case.

A further form of the method advantageously provides that the continuous scanning is performed in situ. Continuous in-situ scanning has for example the advantage that a quality assessment of the coating is possible directly after performing the wet coating of the surface of the metal strip, so that corresponding actions can already be performed at this time, for example selection of a storage location for the correspondingly coated metal strip that is based on the frequency and/or extent of any detected defects.

In a further advantageous refinement of the method, it may for example be provided that a part of the surface of the metal strip provided with the wet coating that is located in the detection region is irradiated with a heat source. The irradiation of the metal strip with a heat source in a region of the detection region has the consequence that the thermal image presents a representation of the reflection of thermal radiation at the surface depicted. On account of the correlation of the reflection coefficient of a material with the transmission coefficient and the absorption coefficient, a thermal imaging performed in such a way produces a thermal image that is to a certain extent analogous to a thermal image of a surface that directly radiates heat, while the thermal images recorded in both ways are equivalent and can be evaluated analogously. This method has in particular the advantage that the emission of thermal radiation can take place without heating the metal strip. Using the thermal imaging of the reflected thermal radiation for the thermal imaging of the metal strip, for example for the detection of coating defects, makes it possible here to use the thermal imaging technique in particular also in those cases in which thermography using the natural radiation of the metal strip is not possible because of a lack of the required temperature of the metal strip.

Furthermore, it may for example be provided that the heat source has a thermal radiation output which in the detection region corresponds to a temperature of a thermal radiation in a range between 35 degrees Celsius and 100 degrees Celsius. Preferably, a temperature in a range between 30 degrees Celsius and 75 degrees Celsius is used. Particularly preferably, a temperature in a range between 35 degrees Celsius and 60 degrees Celsius is used. In a test that has been conducted, a temperature of 50 degrees Celsius has proven to be practicable, providing the advantage that on the one hand the adjustment explained is made possible on account of the temperature being chosen in any event above the ambient temperature, but on the other hand also the additional energy input that has to be expended is not great on account of the comparatively low temperature. In particular, it may be provided that the heat source has a thermal radiation output which in the detection region corresponds to a temperature that is at least 10 kelvins greater than the temperature of the metal strip to be depicted.

It is provided that a thermal image of the thermal radiation of the heat source that is reflected at the metal strip and/or at the metal strip coated with the wet coating is produced by means of the thermal imaging camera.

In a further form of the method, the following steps are also provided:
  that the thermal image of a position of the strip is recorded,
  that a change dT of the measured temperature along a profile is ascertained and
  a change dT with respect to a reference value is used as a comparative value for a comparison with an adjustment table, for an ascertainment of a thickness of the wet coating.

In a measurement of the temperature, on account of the overall emissivity of the assembly comprising the metal strip and the wet coating, which differs according to the thickness of the wet coating, is a measure of the thickness of the wet coating. Here it is not necessarily the case that the absolute thickness of the wet coating must be represented, but instead an assessment over the transverse profile and/or longitudinal profile of the metal strip is sufficient to achieve a measure of the differences in quality within the coating of a surface.

In a particularly preferred refinement, the thermal image of the still wet or moist wet coating is recorded.

Since the emissivity of water, oil, solvents and other liquids is significantly greater than the emissivity of metals, the desired imaging of coated and uncoated regions by means of thermal imaging is made much easier.

Another, independent concept of the invention provides a metal strip-coating device, which comprises a coating station, formed as a wet coating station, for a metal strip to be passed through the coating station for coating a surface of the metal strip with a wet coating. Furthermore, the metal strip-coating device comprises a thermal imaging camera, which is directed at a detection region, the detection region comprising part of the surface of the metal strip.

Preferably, the detection region comprises the entire width of the metal strip.

The metal strip-coating device is preferably designed for carrying out the method explained at the beginning.

In a further refinement of the invention, the metal strip-coating device also comprises a heat source for emitting thermal radiation to the detection region, in order to perform an evaluable thermal imaging by way of detecting the reflection at the surface of the metal strip that is brought about by means of the heat source.

According to a particularly preferred refinement of the invention, the metal strip-coating device comprises a coating station formed as a wet coating station for a metal strip to be passed through the coating station for coating a surface of the metal strip with a wet coating. Furthermore, the metal strip-coating device comprises a thermal imaging camera, which is directed at a detection region, the detection region comprising part of the surface of the metal strip, for the thermal imaging of the still wet or moist wet coating. Preferably, the detection region comprises the entire width of the metal strip.

A further, independent concept of the invention provides a computer program product with computer program instructions, which cause a method according to one of the explained procedures to be performed when the computer program instructions are read by a computing unit, which is designed for controlling a thermal imaging camera and has read access to the thermal image produced.

Furthermore, a use of a metal strip-coating device of the type explained is proposed for coating a metal strip with a wet coating, comprising in-situ thermal imaging of the surface coated with the wet coating and ascertainment of a portion of strip with coating defects, the portion of strip with coating defects being traceably registered after the ascertainment.

In a particularly preferred refinement, a use of a metal strip-coating device of the type explained is proposed for coating metal strip with a wet coating, comprising in-situ thermal imaging of the surface coated with the wet coating, the thermal imaging of the still wet or moist wet coating being recorded, and ascertainment of a portion of strip with coating defects, the portion of strip with coating defects being traceably registered after the ascertainment.

The term coating defect comprises here the possibilities
of a region without coating or
a region with a coating of a layer thickness deviating from a desired thickness.

Likewise proposed is a use of a thermal imaging camera for the thermal imaging of a, preferably still wet or moist, wet coating, of a first material with a first emissivity on a substrate of a second material with a second emissivity, the first emissivity and the second emissivity differing at least by 5%, preferably by 10%, particularly preferably by more than 20%. The thermal image can then be used for the detection of positions with deviations of the coating from desired properties of the coating. The difference of for example 20% relates here to (epsilon_2-epsilon_1)/epsilon_1>0.2, where epsilon_2 is the greater of the two emissivities and epsilon_1 is the smaller of the two emissivities.

Preferably, a thermal radiation reflected at the surface of the first material and/or of the second material is detected for the thermal imaging.

An additional concept, which is intended also to be feasible independently of the invention explained, is an analogous method which provides instead of a wet coating of a metal strip a wet coating of an individual item, in particular a flat steel or a metal sheet.

An additional concept, which is intended also to be feasible independently of the invention explained, is an analogous method which provides instead of a wet coating of a metal strip a wet coating of a paper strip or a plastic strip.

A further additional concept, which is intended also to be feasible independently of the invention explained, is an analogous method which provides instead of a wet coating a dry coating, in particular for example a powder coating.

It is likewise intended that an application for coating individual items can be provided.

Specific refinements of the invention are more specifically explained in detail below with reference to the figures. The figures and accompanying description of the resultant features should not be interpreted as being restrictive, as applying only to the respective refinements, but serve for illustrating forms of the invention that are given by way of example. Furthermore, the respective features may be used in combination with one another and with features of the above description for possible further development and improvement of the invention, especially in the case of additional refinements that are not represented.

FIG. 1a illustrates a metal strip-coating device 1. The metal strip-coating device 1 comprises a coating station 2, formed as a wet coating station. A metal strip 3 is passed through the coating station 2 and coated in the coating station 2 with a wet coating. In a region through which the metal strip runs after the coating there is a detection region 5, which is detected by a thermal imaging camera 4. Thereafter, the metal strip is also dried (not shown). The thermal imaging camera 4 ascertains the two-dimensional temperature distribution of the metal strip running through directly after the wetting of the surface of the strip by the application rollers. Arranged on the thermal imaging camera 4 is a computing unit 6, which by means of a computer program product causes the heat emission of the coated surface to be detected and the detected thermal image to be evaluated.

Figure 1B:
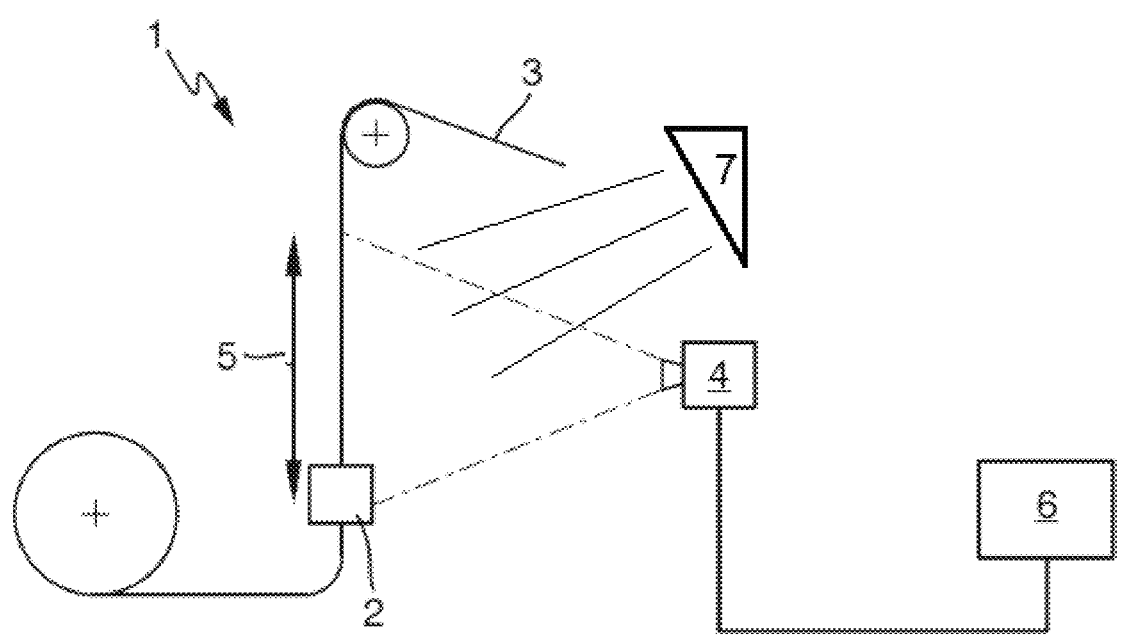
FIG. 1b is a schematic view of another example metal strip-coating device with a heat source for emitting thermal radiation to a detecting region.

The arrangement shown in FIG. 1b differs from the arrangement shown in FIG. 1a merely in that a heat source (7) is additionally arranged for emitting thermal radiation to the detection region.

In the figures of FIG. 2, a sequence of thermal images recorded by means of the thermal imaging camera is represented by way of example, the metal strips being at a temperature of 50 degrees Celsius for production-related reasons. Successively coated metal strips are connected to one another by means of a tack weld. In order that the application rollers are not damaged, they are lifted off or retracted from the strip just before the tack weld arrives and are replaced onto the strip after the tack weld has run through. The strip is consequently uncoated directly upstream and downstream of the tack weld. This coated/uncoated transition has been seen and recorded by the thermal imaging camera.

Figure 2A:
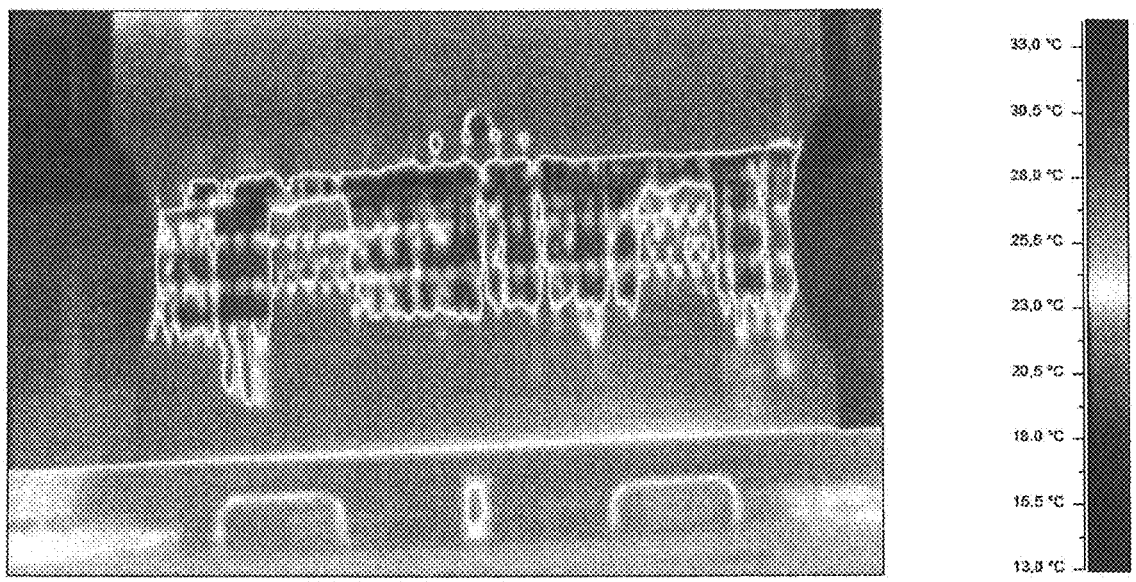
FIG. 2a is a view of an example first thermal image produced in a course of a method for coating a surface of a metal strip by means of detecting a heat emission of a surface coated with a wet coating.
Figure 2B:
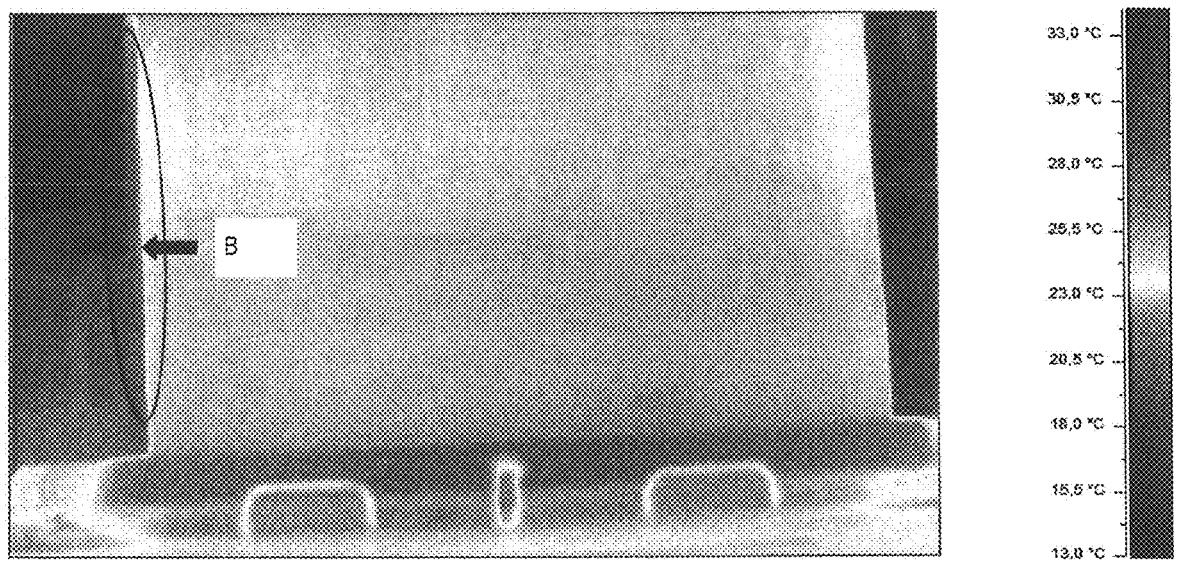
FIG. 2b is a view of an example second thermal image produced in a course of a method for coating a surface of a metal strip by means of detecting a heat emission of a surface coated with a wet coating.
Figure 2C:
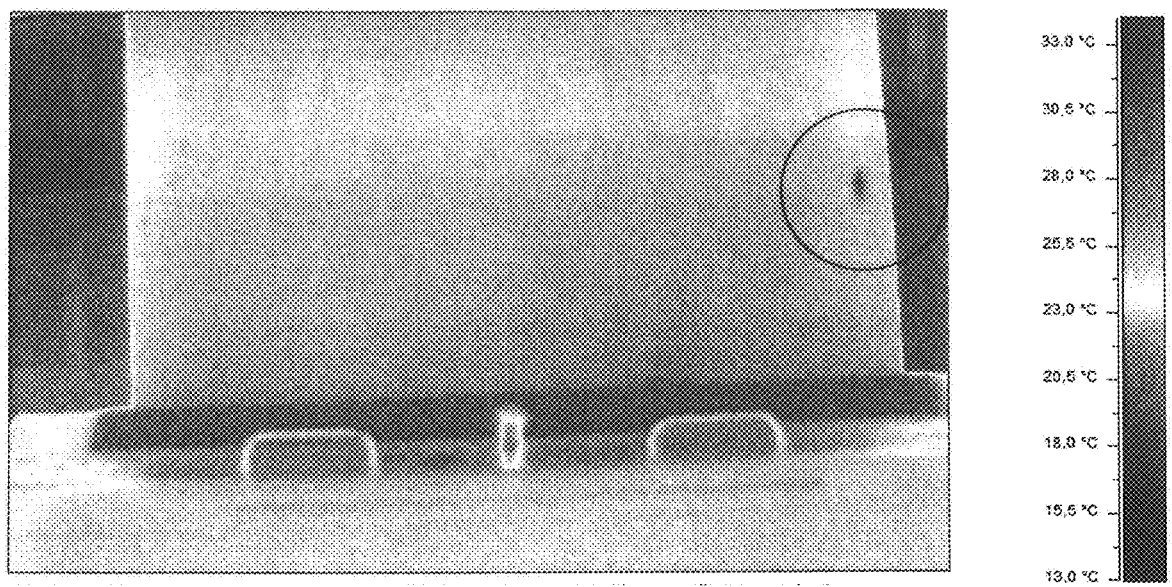
FIG. 2c is a view of an example third thermal image produced in a course of a method for coating a surface of a metal strip by means of detecting a heat emission of a surface coated with a wet coating.
Figure 2D:
FIG. 2d is a view of an example fourth thermal image produced in a course of a method for coating a surface of a metal strip by means of detecting a heat emission of a surface coated with a wet coating.

In the figures:

FIG. 2a shows a partially wet running-through tack weld with remains of moisture of the previous cleaning and rinsing operation. After replacement of the wetting roller, uniform coating is resumed. As FIG. 2b shows, however, in an edge region on the left side there is shown or there can be seen a region (A) that is unwetted by the wet coating. In the thermal image represented, as a consequence of the different emissivities, the unwetted region is represented as a colder region on account of the same scale being used both for the wet coating and in the dry region. This is nevertheless just a matter of representation, since the actual temperature is identical. However, here the actual temperature is neither clearly determinable nor required; instead, the detection takes place by means of thermal imaging, as explained, for the identification of unwetted regions. In a further representation, representation c), a temperature spot that is represented as a region of greater thickness can be seen in a circled region. This spot that is represented shows qualitatively an irregularity in the thickness of the coating. The representation of Figure d) shows moist residues, which are represented as regions of lower temperature.

What is claimed is:

1. A method for coating a surface of a metal strip, the method comprising:
    coating the surface of the metal strip with a wet coating by way of a coating station;
    conveying the metal strip by way of a metal strip-conveying device; and
    detecting the surface coated with the wet coating by producing a thermal image of a detection region that includes at least a part of the surface;
    wherein:
        the detection region is located directly downstream of the coating station; or
        the detection region at least partially comprises the coating station.

2. The method of claim 1 wherein the thermal image is recorded in a spectral range that includes a wavelength between 1 micrometer and 20 micrometers.

3. The method of claim 1 wherein the detection region is at least as large as a widthwise extent of the metal strip.

4. The method of claim 1 wherein the thermal image is produced as a continuous thermal imaging film.

5. The method of claim 4 wherein a portion of the continuous thermal imaging film is produced such that the portion of the continuous thermal imaging film is assignable to at least one of the metal strip or a portion of the metal strip.

6. The method of claim 5 further comprising:
continuously scanning the thermal image for differences in temperature; and
upon finding a temperature difference that is greater than a reference temperature difference, outputting a marking value that is assigned to at least one of a portion of the metal strip or a roll of the metal strip.

7. The method of claim 6 wherein the reference temperature difference is less than 5.0 K.

8. The method of claim 6 wherein the continuous scanning is performed in situ.

9. The method of claim 1 further comprising irradiating with a heat source at least a portion of the at least the part of the surface of the metal strip with the wet coating that is located in the detection region.

10. The method of claim 9 wherein the heat source includes a thermal radiation output that in the detection region corresponds to a temperature in a range of 35-100 degrees Celsius.

11. The method of claim 1 further comprising:
recording a thermal image of a position of the metal strip;
ascertaining a change of a measured temperature along a profile of the metal strip; and
comparing the change of the measured temperature with respect to a reference value, as a comparative value, with an adjustment table for ascertaining a thickness of the wet coating.

12. The method of claim 1 further comprising recording the thermal image of the at least the part of the surface in the detection region while the surface of the metal strip with the wet coating is still wet or still moist.

13. A metal strip-coating device comprising:
a wet coating station for coating a surface of a metal strip that passes through the wet coating station with a wet coating; and
a thermal imaging camera that is directed at a detection region, wherein the detection region comprises at least a part of the surface of the metal strip;
wherein:
the detection region is located directly downstream of the wet coating station; or
the detection region at least partially comprises the wet coating station.

14. The metal strip-coating device of claim 13 further comprising a heat source for emitting thermal radiation to the detection region.

15. The method of claim 13 wherein the detection region is at least as large as a widthwise extent of the metal strip.

* * * * *